Aug. 7, 1928.
J. D. MAXWELL
1,679,485
SALINOMETER, TEST, AND GAUGE COCK
Filed Dec. 7, 1926
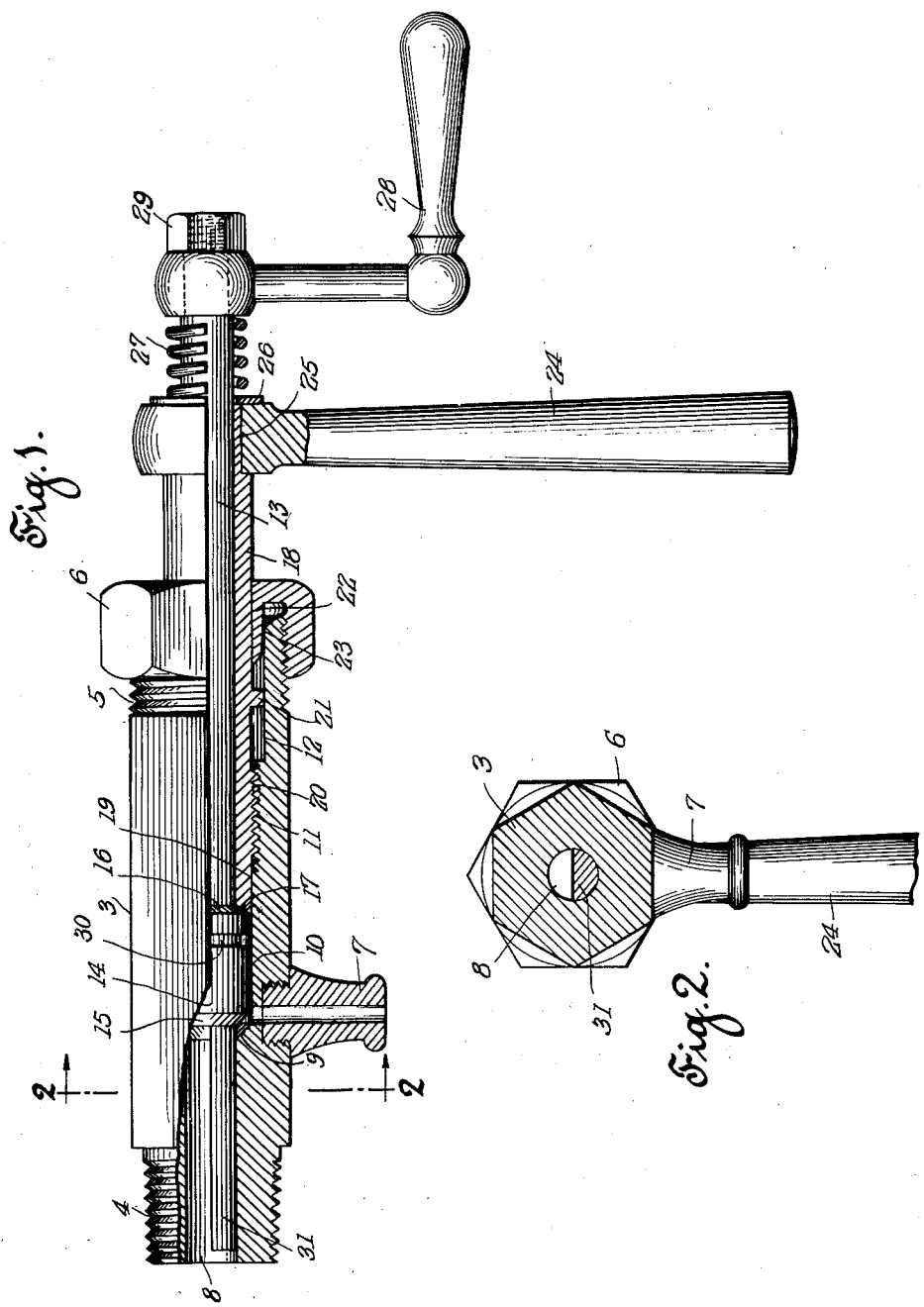
INVENTOR
James D. Maxwell
BY
Philip S. McLean
ATTORNEY Patented Aug. 7, 1928.

1,679,485

UNITED STATES PATENT OFFICE.

JAMES D. MAXWELL, OF BROOKLYN, NEW YORK.

SALINOMETER, TEST, AND GAUGE COCK.

Application filed December 7, 1926. Serial No. 153,168.

The objects of this invention are to provide a gauge cock which can be kept tight at all times without the use of any packing; which will be practically indestructible, which will be relatively simple, inexpensive and efficient in every way.

These objects are attained by certain novel features of construction, combination and relation of parts as set forth in the following specification.

The drawing accompanying and forming part of this specification illustrates a typical embodiment of the invention, wherein the above results are attained but it should be understood that the structure may be varied within the scope of the appended claims.

Figure 1 is a side elevation of one of the preferred forms of the valve with parts broken away and shown in section, the valve being in the open relation.

Figure 2 is a cross sectional view as on the plane of line 2—2 of Figure 1.

The body or barrel of the valve is designated 3 and is shown as externally screw threaded at one end at 4 for mounting purposes and as externally screw threaded at the opposite end at 5 to receive the cap nut 6. The intermediate or main portion of the body is shown as of hexagonal cross section so that a wrench may be applied at any point in the length of the same. A discharge nozzle 7 is shown screwed into this intermediate portion of the body.

Internally the body of the valve is shown formed with a cylindrical bore 8 at its inner end terminating in a conical valve seat 9 from which extends an enlarged bore 10 ending in a screw threaded portion 11 from which there extends to the outer end of the body, a further enlarged bore 12.

The valve proper comprises a stem 13 carrying a cylindrical head 14 with a valve face 15 at its inner end cooperating with valve seat 9 and a valve face 16 at its outer end to cooperate with the conical valve seat 17 at the inner end of the surrounding sleeve 18. This sleeve has a smooth cylindrical portion 19 at its inner end sliding into the bore or valve chamber 10 and the back of that a screw threaded portion 20 engaging the internal screw threads 11 in the body.

This sleeve further has an annular shoulder 21 in back of the screw threads sliding in the enlarged outer cylindrical bore 12. The sleeve has a sliding fit in the cylindrical annular hub extension 22 of the cap screw and the outer side of this hub is tapered as indicated at 23 to make a tight seat in the end of the bore 12.

A handle 24 on the outer squared end 25 of the sleeve serves for turning said sleeve and said handle is held in place on said square end by a washer 26 surrounding the stem and acted on by a spring 27 bearing against the hub of the crank handle 28 which is fixed on the outer end of the stem by the nut 29.

The valve head 14 is of lesser diameter than the valve chamber 10 so as to form a steam space around the same and is shown as grooved circumferentially at 30 to the rear of the nozzle. At the inner end of the valve head and forming substantially a continuation of the valve stem is a scraper 31 shown as a half round rod fitting closely in the bore 8 so as to serve both as a scraper and as a guide for directing the valve face 15 centrally to its seat 9.

In Figure 1 the valve is open so that steam or water can pass through the bore 8 past the conical valve seat 9 and conical valve face 15 into the valve chamber 10 and out through the nozzle. Under these conditions the valve stem is sealed by engagement of the outer valve face 16 with the conical seat 17 at the inner end of the screw sleeve and the screw sleeve is sealed by the tapered engagement of the surrounding hub of the cap nut in the end of the valve body at 23.

The spring 27 acting between the end of the screw sleeve and the outer end of the valve stem holds the conical sealing faces 16, 17, closely engaged at this time and causes the valve stem to follow the screw stem in its unscrewing or valve opening movement. At the same time this spring relation permits the valve stem being turned by its handle 28 to grind in a new seating engagement at 16, 17. This independent turning the valve stem within the sleeve permits the same being rotated for the purpose of clearing the inner steam passage 8.

The valve is closed by simply turning the handle 24 of the screw sleeve so as to advance the valve head into engagement with the inner valve seat 9. This handle may be utilized to apply pressure to the valve head while the valve stem is turned to re-surface the valve seat 9 and valve face 15 or to hold the valve at the proper point while the valve stem is being turned to cut away any accumulation in the inner bore 8.

The annular shoulder 21 on the screw sleeve by engaging the inner end of the hub of the cap screw acts as a stop to limit the unscrewing movement of the sleeve, but upon removing the cap screw the screw sleeve can be turned out of the valve body, carrying with it the valve stem.

The valve stem with its double faced valve head and scraper at the inner end of the same can be made all in a single piece and similarly, the screw sleeve with its seat face and external stop shoulder and the cap screw with tapered hub can each be made in one piece. The structure, therefore, is simple, durable, relatively inexpensive and easily assembled and the valve can be maintained steam-tight at all times and under all conditions.

The lever handles on the screw sleeve and the valve stem enable sufficient force being applied to these parts to effect the perfect sealing of the valve under all conditions.

With this double stem construction it is possible to grind in the valve faces or to clear the outlet passage without opening the valve. That is, the valve can be held to its seat by means of handle 24 while it is being turned by means of handle 28. The outlet nozzle is located closely adjacent the edge of the valve seat 9 so that the steam will have an immediate outlet. The groove 30 in the valve head being located to the rear of the nozzle serves to collect and hold water which forms a sealing ring in the valve chamber.

What is claimed is:

1. A gauge cock comprising a one piece valve body having a steam passage at the inner end of the same, an enlargement providing a steam chamber at the outer end of said passage and a screw threaded portion extending outwardly from said steam chamber, a conical valve seat between said passage and chamber, a valve stem having a scraper operating in the steam passage and a valve head operating in the steam chamber, said valve head having oppositely facing conical valve faces at the ends of the same, the inner one adapted to engage the valve seat in the valve body, a sleeve having a screw engagement with said screw threaded portion of the valve body, said sleeve surrounding the outer portion of the valve stem and having a conical face at the inner end of the same adapted to engage the outer conical face of the valve head and an angularly projecting lever handle on the outer end of said sleeve by which said sleeve may be forcibly turned to effect close fitting firm engagement of the valve faces at opposite ends of the valve head with the valve seats in the body and at the end of the sleeve respectively, the outer end of the valve stem having means to enable the turning of the same to re-surface the conical valve faces aforesaid.

2. A gauge cock comprising a one piece valve body having a steam passage at the inner end of the same, an enlargement providing a steam chamber at the outer end of said passage and a screw threaded portion extending outwardly from said steam chamber, a conical valve seat between said passage and chamber, a valve stem having a scraper operating in the steam passage and a valve head operating in the steam chamber, said valve head having oppositely facing conical valve faces at the ends of the same, the inner one adapted to engage the valve seat in the valve body, a sleeve having a screw engagement with said screw threaded portion of the valve body, said sleeve surrounding the outer portion of the valve stem and having a conical face at the inner end of the same adapted to engage the outer conical face of the valve head and an angularly projecting lever handle on the outer end of said sleeve by which said sleeve may be forcibly turned to effect close fitting firm engagement of the valve faces at opposite ends of the valve head with the valve seats in the body and at the end of the sleeve respectively, the outer end of the valve stem having means to enable the turning of the same to re-surface the conical valve faces aforesaid and a cap screw surrounding the screw sleeve and having a hub portion in sealing engagement within the outer end portion of the body, the body having a further enlargement at the outer end of the screw threaded portion to receive said hub portion of the cap screw.

3. A gauge cock comprising a valve body having a steam passage at the inner end of the same, an enlargement providing a steam chamber at the outer end of said passage and a conical valve seat between said passage and chamber, a valve stem having a scraper operating in the steam passage and a valve head operating in the steam chamber, said valve head having oppositely facing conical valve faces at the ends of the same, the inner one adapted to engage the valve seat in the valve body, a sleeve having a screw engagement in the valve body, said sleeve surrounding the outer portion of the valve stem and having a conical face at the inner end of the same adapted to engage the outer conical face of the valve head and an angularly projecting lever handle on the outer end of said sleeve by which said sleeve may be forcibly turned to effect close fitting firm engagement of the valve faces at opposite ends of the valve head with the valve seats in the body and at the end of the sleeve respectively, the outer end of the valve stem having means to enable the turning of the same to re-surface the conical valve faces aforesaid and a cap screw engaged on the end of the body, said cap screw having a hub surrounding the screw sleeve and the screw sleeve having a stop shoulder for engagement with said hub.

4. A gauge cock comprising a valve body having a steam passage at the inner end of the same, an enlargement providing a steam chamber at the outer end of said passage and a conical valve seat between said passage and chamber, a valve stem having a scraper operating in the steam passage and a valve head operating in the steam chamber, said valve head having oppositely facing conical valve faces at the ends of the same, the inner one adapted to engage the valve seat in the valve body, a sleeve having a screw engagement in the valve body, said sleeve surrounding the outer portion of the valve stem and having a conical face at the inner end of the same adapted to engage the outer conical face of the valve head and an angularly projecting lever handle on the outer end of said sleeve by which said sleeve may be forcibly turned to effect close fitting firm engagement of the valve faces at opposite ends of the valve head with the valve seats in the body and at the end of the sleeve respectively, the outer end of the valve stem having means to enable the turning of the same to re-surface the conical valve faces aforesaid, the screw sleeve having an angular outer end on which the operating lever is engaged, a washer overstanding said lever and a spring bearing on said washer and against the said means for turning the valve stem.

5. A salinometer, test or gauge cock comprising a one piece valve body having a steam passage in the inner end of the same, a conical valve seat at the end of said steam passage, a valve chamber in back of said valve seat and an internally screw threaded portion in back of said valve chamber and extending toward the outer end of the valve body, an outlet nozzle opening through the side of the valve body from a position in the valve chamber closely adjacent the conical valve seat, a continuous one piece valve stem having a scraper operating in the steam passage and a valve head operating in the steam chamber, said valve head having oppositely facing conical valve faces, one at the inner end of the scraper to engage the conical valve seat at the outer end of the steam passage and the other disposed in the valve chamber, said one piece valve stem projecting from the outer end of the valve body and having means at the outer projecting end of the same for enabling rotation thereof and a sleeve having a rotatable engagement over the valve stem, said sleeve having a conical face at the inner end of the same adapted to engage the outer conical face of the valve head, external screw threads in back of said conical face directly engaging the interiorly screw threaded portion of the valve body and a handle on the outer end of the sleeve enabling the same to be rotated independently of the valve stem carrying the valve head and the scraper.

In witness whereof, I have hereunto set my hand this 30th day of November, 1926.

JAMES D. MAXWELL.